C. W. CORR.
Gang-Plow.
No. 49,087. Patented Aug. 1, 1865.
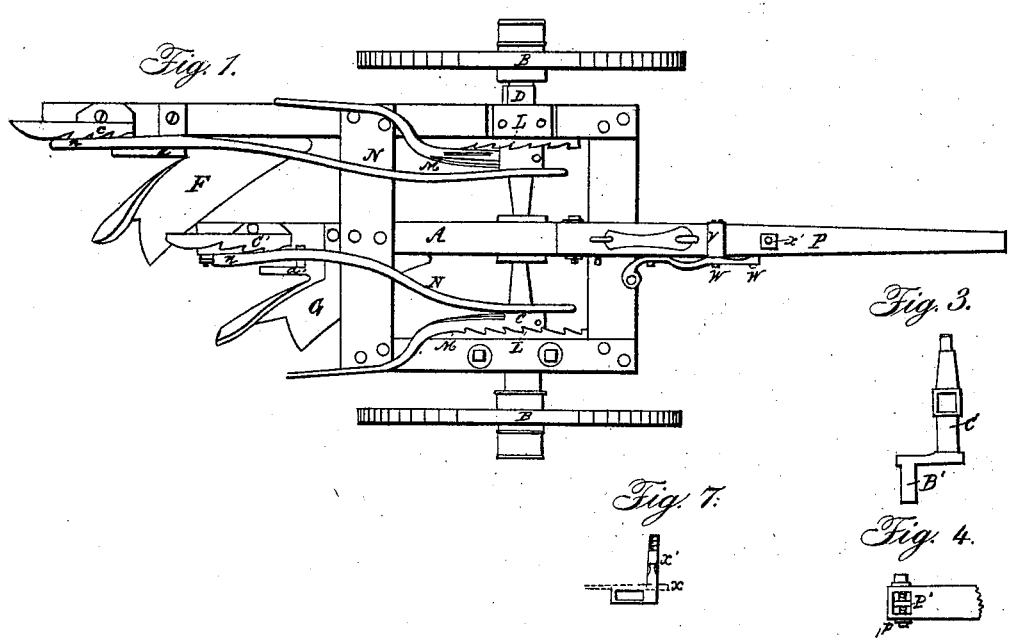
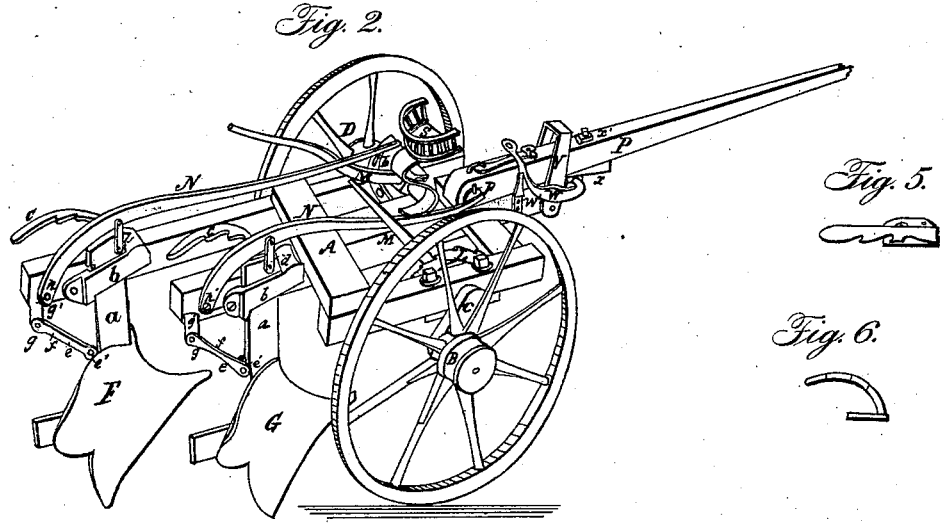
Witnesses:
Thos. M. Metcalf
Julius G. Koester
Inventor:
Columbus. W. Corr

UNITED STATES PATENT OFFICE.

C. W. CORR, OF CARLINVILLE, ILLINOIS.

IMPROVEMENT IN GANG-PLOWS.

Specification forming part of Letters Patent No. 49,087, dated August 1, 1865.

*To all whom it may concern:*

Be it known that I, COLUMBUS W. CORR, of Carlinville, in the county of Macoupin, and State of Illinois, have invented certain new and useful Improvements in Gang-Plows; and I do hereby declare that the following is a full, clear, and exact description thereof, reference being had to the accompanying drawings and the letters of reference marked thereon, making part of this specification, in which—

Figure 1 is a top-plan view; Fig. 2, a perspective view, and Figs. 3, 4, 5, 6 and 7 views of portions of the same detached.

Similar letters refer to like parts wherever they occur.

The nature of my invention consists in attaching two or more plows to a frame mounted on wheels, which are attached to independent crank-axles in such a manner that they can be adjusted at will independently.

It also consists in a novel method of attaching the plows so that they can be adjusted at will or thrown entirely out of the ground, and also in certain devices, hereinafter explained, for regulating the apparatus as may be required.

To enable others skilled in the art to construct and use my invention, I will proceed to describe it.

A represents the frame, which may be made of any desired form and size, though preferably as shown in the drawings, the beams being of different lengths, so as to bring one plow somewhat in advance of the other. I then construct two crank-axles, C, of the shape and style shown in Fig. 3, which are secured to the main frame, as shown in Fig. 1, the axles being secured in suitable metal boxes bolted to the longitudinal timbers of the frame, one axle being secured to the upper and the other to the under side of the frame, the wheels B being mounted on the arms B' of the axles C. These axles C are cast with a mortise or hole in them, in which a lever, M, is pivoted, said lever having a spring attached to it and bearing against one side of said mortise so as to keep said lever in contact with the notched segment-rack secured to the side timbers of the frame, as shown in Figs. 1 and 2, the form of the rack being shown by Figs. 5 and 6.

The plows F and G are firmly secured to the standards *a* which standards are secured to the beams by means of the metallic pieces *b*, which are made of such a form as to encircle the standards *a* and hold them firmly in place, at the same time allowing the plow-standards to slide up and down therein. The pieces *b* are made with a flange at its rear and by which it is firmly bolted to the side of the beam, and has its front portion turned at a right angle and so formed as to lie flat upon the top of the beam, at which point it is also secured by a bolt. By this means I secure a very strong and firm method of attaching the plows to the beams, while at the same time the former are left free to move up and down as may be required.

A brace, *f*, is pivoted at one end to the rear of the standard *a*, and at its opposite end to a metallic plate or lug, *g'*, bolted firmly to the rear of the beams, as shown in Fig. 2. The upper ends of the standards *a* are provided with a shoulder, which, resting on the piece *b*, prevents the plows from being depressed beyond a certain point, the upper front face of *a* resting securely against the front cross-piece of *b*, and holding the plow firmly in place.

A lever, N, is pivoted to the beams in rear of the pieces *b*, and, passing forward over the standard *a*, are attached thereto by links or stirrups *d*, as shown in Fig. 2. These links are so constructed as to allow of a little lateral movement to the levers N.

A curved rack, *c*, provided with notches on its face next to the lever N, is attached firmly to the beams, as shown in Fig. 2, the notches being so beveled or inclined that when the lever N is raised and forced into any one of said notches it will be retained there until again removed. A seat, S, is located upon the front portion of the frame in such a position that the driver, when seated therein, can readily reach and operate the levers M and N.

The tongue P is secured by a bolt, *p*, Fig. 4, to a metal lug, *p'*, attached to the front cross-bar of the main frame. This lug *p'* has a hole in it, with a screw-thread cut in it to fit the screw on bolt *p*, which latter is provided with a square head, by which means it can be turned so as to move the rear end of the tongue to the right or left, and thus throw the plows to or from the land, as desired.

The front end of the right or central beam is allowed to project somewhat beyond the front cross-bar, and to its front end is secured a metallic stirrup or guide, V, of such a height as to permit the tongue to play up and down therein, and forming a fulcrum for the tongue as its rear end is adjusted laterally by means of the screw-bolt $p$, as already described. To the side of this stirrup V a foot-lever, W, is pivoted, and having its front portion bent at a right angle and passing through the lower slotted portion of the bolt X' underneath the tongue. By pressing with his foot upon the rear end of this lever W, the front end of the tongue being fixed in the neck-yoke, the front portion of the main frame is depressed, whereby the rear portion is elevated and the plows raised from the ground, as is necessary in turning at the ends of the furrows. A bar, $w'$, is secured to the front of the frame, as shown in Fig. 1, so that when said lever W is depressed it can be secured by a notch or projection on the side of the bar, the lever, when elevated, being kept in place by resting on the top of said bar $w'$, as shown in Fig. 1.

A slotted wedge, $x$, is placed under the tongue in such a position as to come directly over the front end of the lever W, where it is held by shoulders on the bolt $x'$, which passes through a longitudinal slot in the wedge $x$. By means of this wedge, which may be moved by loosening the bolt $x'$, the tongue can be so set as to elevate the rear portion of the frame, with the plows, more or less, as may be desired.

By this construction and arrangement of the parts I am enabled to produce a very perfect instrument—one that is capable of being adjusted in every desirable manner. By means of the crank-axles and their levers N the wheels can be independently adjusted to adapt the implement to work on a hillside, or to make the frame stand level, with one wheel resting in the furrow, while the other is upon the unplowed land, and thus obviate the necessity of making the wheels of different sizes.

A reverse notch in the lower portion of the racks $c$ serves to hold the levers N down and keep the plows from being raised when at work, while either or both of them can be raised clear from the ground at any time by raising the levers, and they may be kept in that position as long as desired by simply letting the levers rest in the notches in the rack.

Having thus fully described my invention, what I claim is—

1. The crank-axles C, provided with the hole or its equivalent, as shown and described.

2. Securing the plows by means of the clip $b$ and brace $f$, substantially as shown and described.

3. The combination of the plow-standards $a$, stirrups $d$, and lever N, all arranged to operate as and for the purpose set forth.

4. Attaching the independent crank-axles C one above and one below the main frame, as shown and described.

5. The stirrup or guide V, in combination with the bolt $p$ and stud $p'$, for the purpose of adjusting the tongue laterally, and at the same time permit it to have a vertical movement, as and for the purpose set forth.

6. The foot-lever W, arranged to operate in connection with the tongue and main frame, with its front end working in the slotted bolt $x$, as and for the purpose set forth.

7. The slotted bolt $x'$, in combination with the slotted wedge $x$, for the purpose of adjusting the parts, as shown and described.

C. W. CORR.

Witnesses:
JULIUS G. KOESTER,
SAMUEL PITMAN.